R. COFFMAN.
FENDER PULVERIZER FOR PLOWS.
APPLICATION FILED AUG. 20, 1919.
1,330,686.
Patented Feb. 10, 1920.
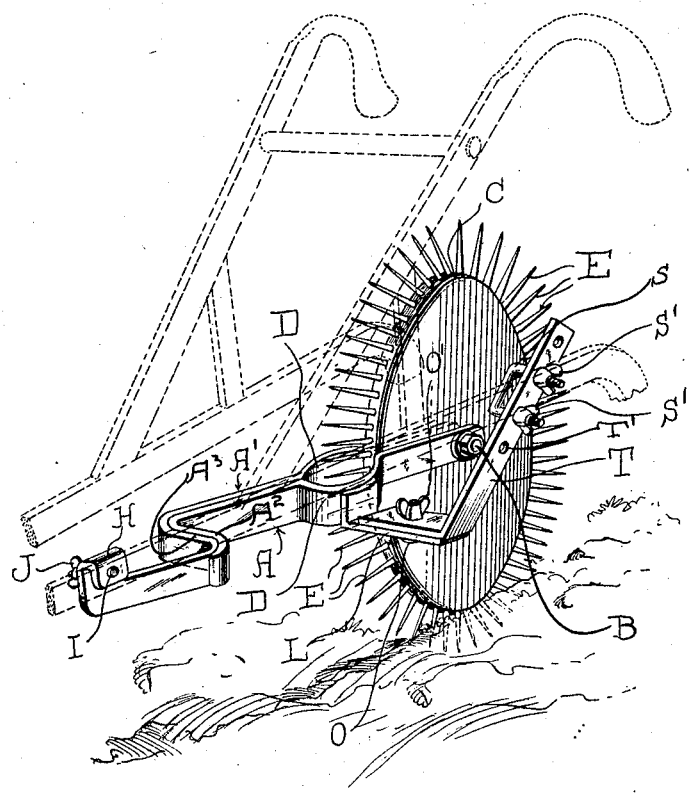

UNITED STATES PATENT OFFICE.

RAY COFFMAN, OF MAUERTOWN, VIRGINIA.

FENDER-PULVERIZER FOR PLOWS.

1,330,686.

Specification of Letters Patent.

Patented Feb. 10, 1920.

Application filed August 20, 1919. Serial No. 318,826.

*To all whom it may concern:*

Be it known that I, RAY COFFMAN, a citizen of the United States, residing at Mauertown, in the county of Shenandoah and State of Virginia, have invented certain new and useful Improvements in Fender-Pulverizers for Plows; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in combination fenders and pulverizers for plows, and consists of a simple and efficient device of this nature, designed especially for shovel plows, and so arranged as to be adjustable for different widths of plows.

My invention consists of a simple and efficient device of this nature having various details of construction, combination and arrangement of parts which will be hereinafter fully described, shown in the accompanying drawings and then specifically defined in the appended claim.

My invention is illustrated in the accompanying drawings which, with the letters of reference marked thereon, form a part of this application, and in which I have shown a perspective view of my improved attachment, the plow beam and handles being shown in dotted lines.

Reference now being had to the details of the drawings by letter:

A and A' designate two bars each of which is bent to form oppositely disposed bowed portions D, and the rear ends of said bars are spaced apart a slight distance and carry a shaft B, upon which the wheel C is journaled, provided with radial teeth E. Said wheel rotates in the space between the flaring portions of the bars A and A'. Said bar A is bent to form a compound curve $A^2$, and the bar A' is similarly bent to form a compound curve $A^3$, and which curved portions are in contact with each other, as are also the parts of the bars A and A' intermediate the compound curves and the bowed portions.

The bar A' has an extension over which a clevis-shaped plate is mounted and fastened by means of a bolt I having a winged nut J thereon, and which forms means whereby said clevis-shaped member may be fastened to the beam of a plow, shown in dotted lines in the drawings. Fastened to one of said bowed portions of the frame is an angle bar L which has a bar T secured thereto through the medium of a screw O upon which a winged nut O' is provided. The bar T is provided with apertures T', in which a bail-shaped rod S is held by the winged nuts S', and which is adapted to engage the plow frame in the manner shown in dotted lines.

By the provision of a fender made in accordance with my invention, it will be noted that the same may be held in different adjusted positions upon plows of different widths and may be adapted to operate at different depths. The spikes projecting from the circumference of the wheel will have a tendency to break up and pulverize the soil which becomes caked from baking under the heat of the sun, and reduce the same to a mellow condition.

What I claim to be new is:

An adjustable fender and pulverizer for plows comprising two bars each bent to form oppositely disposed bowed portions, with portions of the bars rearward thereof flaring, and a shaft journaled in the rear ends of the bars, a wheel journaled upon said shaft and provided with radial teeth, said bars in advance of the bowed portions in contact with each other and each having a compound curved portion, one of said bars extending beyond the other, and a clevis-shaped member fastened thereto, an angle bar fastened to one of said bowed portions, an adjustable bar secured thereto, and a clevis-shaped member upon said adjustable bar, and nuts upon said member affording means for attachment of the device to the frame of a plow.

In testimony whereof I hereunto affix my signature.

RAY COFFMAN.